J. A. PERKINS.
ROLLER BEARING CAGE.
APPLICATION FILED OCT. 27, 1910. RENEWED JAN. 31, 1916.
1,197,059.
Patented Sept. 5, 1916.
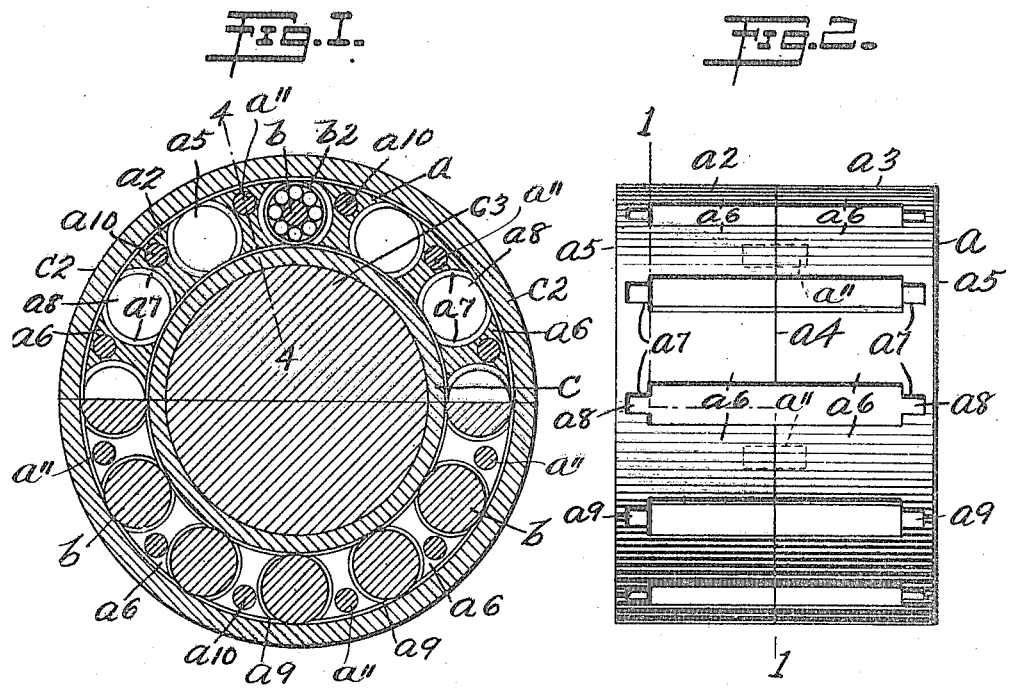
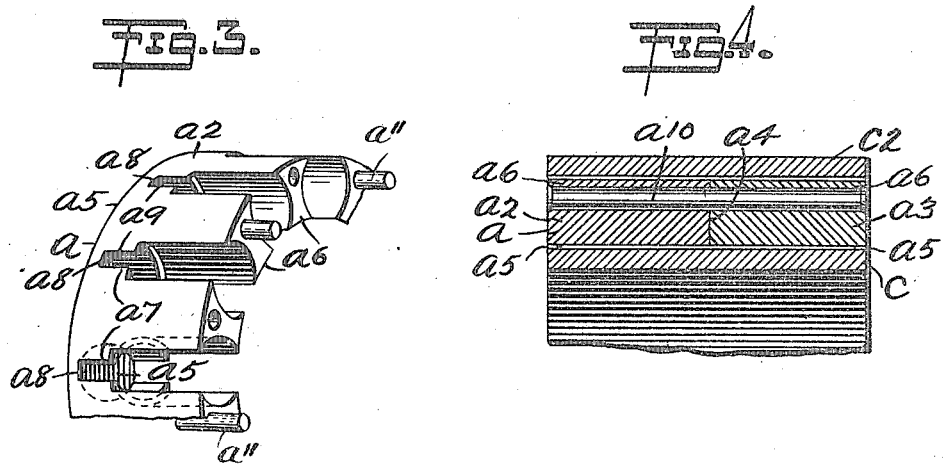
Attest:
G. Robert Thomas
D. Ellie Browne
Inventor:
by Julius A. Perkins
J. Elvin Laithe Atty

UNITED STATES PATENT OFFICE.

JULIUS A. PERKINS, OF OMAHA, NEBRASKA.

ROLLER-BEARING CAGE.

1,197,059.  Specification of Letters Patent.  Patented Sept. 5, 1916.

Application filed October 27, 1910, Serial No. 589,367. Renewed January 31, 1916. Serial No. 75,471.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearing Cages, of which the following is a specification, such as will enable those skilled in the art to which it appertains to make and use the same.

This invention relates to roller bearings, and the object thereof is to provide a strong, rigid, simple, and cheaply constructed cage of rollers, as a unit, wherein the rollers are irremovably arranged, thus permitting the entire device to be stored, handled, shipped, and installed, without danger of loss or dislodgment of any of the parts, and obviating the necessity for assembling for installation, with a consequent freedom from the carelessness or inaccuracy of unskilled persons, and positively insuring the original factory adjustment of parts.

A further object is to provide roller alining means, also similarly sealed in the cage, of circular form and revoluble with the rollers but at a much slower speed in similarly formed recesses therefor, whereby a slight looseness and flexibility result, and thus avoids the localizing of wear of either the said means or the cage, said means being preferably made of metal and of a degree of hardness different from that of the cage.

A further object is to provide each end of each roller with a journal of relatively great diameter to obtain the greatest possible strength and wearing surface, and also to provide correspondingly diametrically enlarged roller alining means on the said journals of the greatest possible protrusion, radially of the cage, the cage ends being made of relatively great thickness to compensate for the weakness caused by the removal of metal to permit such protrusion of the said means beyond the peripheries of the cage, inner and outer, and such removal of metal providing ample egress for foreign matter that, in the bearing operation, might work into the space between the said alining means and the cage ends, this construction differing over the form shown in a concurrent application in that the ability to increase the cage length, with the same length of rollers, permits a corresponding increase in the size and strength of the roller journals and alining means.

My invention is fully set forth in the following specification, of which the accompanying drawings form a part, in which the separate parts are designated by the same reference characters in each of the views, and in which:—

Figure 1 is a sectional view, on the line 1—1 of Fig. 2, of my invention in position for use; Fig. 2 is an elevation of the cage alone; Fig. 3 is a fragmentary view of the construction of one of the cage elements; and Fig. 4 is a section on the line 4—4 of Fig. 1.

In the drawings forming a part of this application I have shown a cage $a$ carrying a plurality of rollers $b$ interposed between a journal $c$ and outer bearing member $c^2$, the journal $c$, in the form shown, being a sleeve mounted upon a shaft or axle $c^3$ and, in the form shown, my cage consists of two exactly similar elements $a^2$ and $a^3$ joined upon a line $a^4$ in the cage center but I do not confine myself to this particular form.

Each of the cage elements $a^2$ and $a^3$ comprises an annular end plate $a^5$ having a plurality of integral ribs $a^6$ thereon and inwardly directed, the sides of said ribs being preferably segmental in exterior conformation and concentric with the rollers therebetween, and at a point adjacent the end plate $a^5$ I form shoulders $a^7$ on said ribs and thus provide recesses $a^8$ of less diameter than the roller spaces and extending to the end plate, and it will be observed that the cage periphery is cut away in this construction as shown at $a^9$ thus forming a clear passage across the annular plate $a^5$ in the position of each of the roller spaces, this being an important feature as will be later explained and it will be noted that the end plates are maintained intact.

The ribs of each cage element in the form shown, extend to a point midway of the cage itself, and are squared at their ends in order to form a clean joint, and some or all of the said ribs are provided with longitudinal passages therethrough which, when the cage is assembled, are adapted to receive rods $a^{10}$ which are riveted or otherwise secured in the cage to hold the elements thereof together, and I also employ dowels $a^{11}$ in one element engaging the other element in the rib ends not provided with the rods $a^{10}$, to hold the same against movement.

The rollers $b$ are preferably provided with anti-frictional end guides $b^2$, in the form of cups having balls interposed between the same and the roller end, and it will be noted that the said guides are circular and are loosely fitted into the recesses $a^8$, thus permitting their revolution about the roller pintles to prevent the localizing of wear by presenting constantly changing points for sustaining the weight of the cage and the strain of roller alinement, and also permitting a certain degree of movement therein whereby scale or other foreign matter is carried through the recesses $a^8$, thus keeping the same clear.

It will be observed that, in view of the material cut away, or provided as blank spaces, between the shoulders of the ribs, it is necessary to strengthen the end-plates, thus requiring greater space for the cage of rollers than in the construction shown in a concurrent application, but this is essential for the reason that the present construction is intended for use in places exposed to dust or other dirt which is permitted to work through the cage between the alining means and the end-plates in the manner already described and in which places the rollers may be shortened or the cage lengthened, preferably the latter, and, when the cage of rollers and alining means are assembled, it will be seen that I provide a cage of rollers and alining means as a unit and from which neither the alining means or rollers are removable, either by accident or design, even though a roller should become detached from its alining means from any cause, and, the roller spaces being but slightly greater in diameter than the rollers, said rollers are maintained in substantial alinement even if such roller detachment should occur in the use or handling of the cage of rollers.

My cage is very simple, inexpensive, and remarkably rigid for the size and weight thereof, in fact as rigid as a solid cage when the parts, in the form shown, are assembled properly and, because of the revoluble alining means, there is practically no wear to any of the parts as all the parts roll one upon another except where the alining means impinge upon the end-plates and, even there, no wear results when the axle thrust forces the said parts together for the reason that the resistance caused by such contact is infinitely greater than any resistance that could occur between the roller ends and the alining means with the interposed anti-friction means, and the said alining means therefore remain stationary during such temporary contact.

My invention is very practical, light, compact, inexpensive, and strong, and various modifications of the details shown and described may be made, within the scope of the following claims, and still be within the spirit of my invention.

Having fully described the same, what I claim as new and desire to secure by Letters Patent, is:—

1. As an article of manufacture, for use in a bearing, a cage comprising end-plates provided with inwardly directed, spaced, shoulders having concaved adjacent sides forming circular recesses, parallel ribs connecting corresponding shoulders, and forming roller spaces, a roller in each of said spaces and a circular bearing block at each end of each of said rollers revoluble in corresponding recesses to present constantly changing sustaining points for the cage and for the roller alinement to prevent the localizing of wear.

2. As an article of manufacture, for use in a bearing, a cage comprising end-plates provided with inwardly directed, spaced, shoulders having concaved adjacent sides forming circular recesses, parallel ribs connecting corresponding shoulders and forming roller spaces, a roller in each of said spaces and a circular bearing block at each end of each of said rollers revoluble in corresponding recesses, said bearing block being of a diameter approximating that of the rollers and the radial width of said end-plates, to gain maximum strength.

3. As an article of manufacture, for use in a bearing, a cage comprising end-plates provided with inwardly directed shoulders having concaved adjacent sides forming circular recesses, parallel ribs connecting corresponding shoulders and forming roller spaces, a roller in each of said spaces and a circular bearing block at each end of each of said rollers revoluble in corresponding recesses, said shoulders being suitably spaced to permit the passage of matter across the end-plates, between the same and said bearing block.

4. As an article of manufacture, for use in a bearing, a cage comprising end-plates provided with inwardly directed, spaced, shoulders having concaved adjacent sides forming circular recesses, parallel ribs connecting corresponding shoulders and forming roller spaces, a roller in each of said spaces and a circular bearing block at each end of each of said rollers, and revoluble in corresponding recesses, said ribs being concaved on adjacent sides concentric with said rollers and of a radius approximating that of said rollers, whereby said rollers are locked in said cage and maintained in approximate alinement in the event of their detachment from corresponding bearing blocks.

5. As an article of manufacture, for use in a bearing, a cage comprising end-plates provided with inwardly directed, spaced, shoulders having concaved adjacent sides forming circular recesses, parallel ribs connecting corresponding shoulders and forming roller spaces, a roller in each of said spaces, a circular bearing block at each end of each of said rollers revoluble in corresponding recesses, and anti-friction means interposed between the roller ends and corresponding bearing blocks, the alining of said rollers and weight of said cage being taken through said shoulders, bearing blocks, anti-friction means and roller pintles in a plane at right angles to the longitudinal axes of said rollers and through the centers of said anti-friction means.

6. In a bearing, the combination of a cage comprising end plates and connecting ribs with roller spaces between the same, rollers in said spaces, the end plates having a recess at each end of each roller space with an opening through the inner and outer peripheries in the radial line of said cage, and revoluble roller bearing blocks in said recesses.

7. In a bearing, the combination of a cage comprising end plates and connecting ribs with roller spaces between the same, rollers in said spaces, the end plates having a recess at each end of each roller space with an opening through the inner and outer peripheries in the radial line of said cage, revoluble roller bearing blocks in said recesses, and anti-friction means between said blocks and corresponding roller ends.

8. In a bearing, the combination of a cage comprising end plates and connecting ribs, said cage being formed of transversely divided sections, rollers in said cage, said end plates having recesses therein at each roller end and said recesses having openings through the inner and outer peripheries in the radial line of said cage, and revoluble roller bearing blocks in said recesses for the roller ends.

In testimony that I claim the foregoing as my invention I have signed my name in presence of the subscribing witnesses this 20th day of October 1910.

JULIUS A. PERKINS.

Witnesses:
GEORGE E. MINER,
F. ELLIS BROWNE.

Copies of this patent may be obtained for five cents each, by addressing the "Commissioner of Patents, Washington, D. C."